J. B. CORNELL.
Fire-Proof Roofs.

No. 139,945.

Patented June 17, 1873.

Witnesses:
A. Bennerendorf
D. Sedgwick

Inventor:
J. B. Cornell
Per
Attorneys.

UNITED STATES PATENT OFFICE.

JOHN B. CORNELL, OF NEW YORK, N. Y.

IMPROVEMENT IN FIRE-PROOF ROOFS.

Specification forming part of Letters Patent No. 139,945, dated June 17, 1873; application filed May 24, 1873.

*To all whom it may concern:*

Be it known that I, JOHN B. CORNELL, of the city, county, and State of New York, have invented a new and Improved Fire-Proof Flat or Deck Roof, of which the following is a specification:

My invention consists of light iron beams or rafters, covered with sheet-iron, corrugated with dovetail grooves, and secured to the rafters or beams by metal brackets riveted to it, and hooked under the rafters, a top covering of fire and water-proof cement, and a mortar coat on the inside, plastered on the sheet-metal, and secured by the dovetail grooves and ribs; the whole constituting a light, durable fire-proof roof, which is not subject to the dampness on the inside common to the metal-lined fire-proof by the condensation of moisture on the iron.

Figure 1:
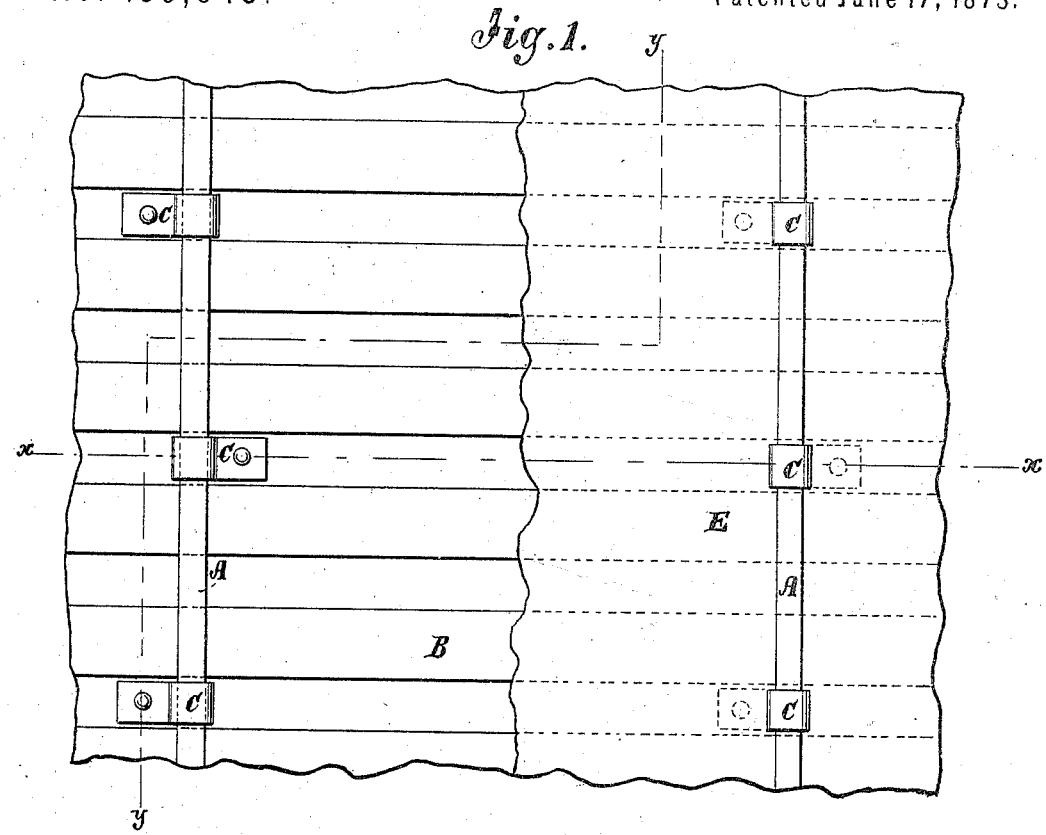
Figure 2:
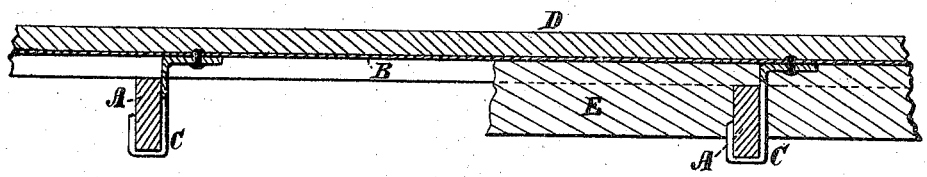
Figure 3:
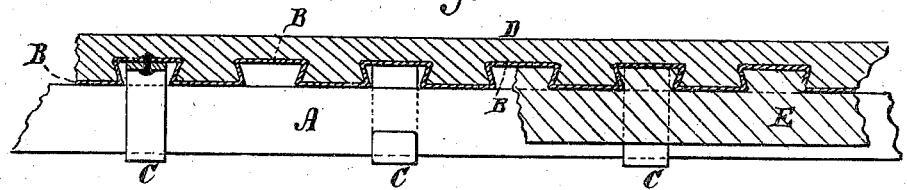

Figure 1 is a plan view of the under side of a section of roof constructed according to my improvement, a part of the plaster coat being detached. Fig. 2 is a section of Fig. 1 on the line $x\ x$, and Fig. 3 is a section in the line $y\ y$.

A represents the iron rafters or beams; B, the sheet-metal cover with dovetail-shaped corrugations; C, the brackets by which the cover and the rafters are connected together; D, the top cover of fire-and-water-proof cement; and E the inner coat of plaster.

The corrugated iron with dovetail grooves serves to hold the plaster as well as lath would do, and dispenses with the lath, also with the wood for nailing the lath on, so that a perfectly fire-proof roof is secured; and by plastering on to the metal, the objection to the uncovered metal on account of the dampness by the condensation of the aqueous vapor of the atmosphere is wholly prevented, for the plaster, being a non-conductor, prevents the escape of heat, so that the cooling process which takes place on the surface of the iron, and condenses the vapor, is prevented.

Having thus described my invention, I claim as new and desire to secure by Letters Patent—

The combination of the iron rafters or beams, dovetail corrugated sheet-iron cover, fire-and-water-proof top cover, and an inner coat of plaster, for a roof, substantially as specified.

JOHN B. CORNELL.

Witnesses:
 H. W. REDFIELD,
 THOMAS CROCKER.